United States Patent [19]
Earnest

[11] Patent Number: 4,888,798
[45] Date of Patent: Dec. 19, 1989

[54] MODULAR SOFTWARE SECURITY

[75] Inventor: Lester D. Earnest, Los Altos Hills, Calif.

[73] Assignee: OMS, Inc., Mobile, Ala.

[21] Appl. No.: 894,085

[22] Filed: Aug. 7, 1986

Related U.S. Application Data

[63] Continuation of Ser. No. 725,254, Apr. 19, 1985, abandoned.

[51] Int. Cl.⁴ ............................................. H04L 9/00
[52] U.S. Cl. .......................................... 380/4; 380/25; 340/825.31; 340/825.34
[58] Field of Search ................ 128/22.08, 22.09, 22.10, 128/22.14; 380/23–25, 28, 3, 4; 364/200, 900

[56] References Cited

U.S. PATENT DOCUMENTS

| | | | |
|---|---|---|---|
| 3,962,539 | 6/1976 | Ehrsam et al. | 178/22.07 |
| 4,302,810 | 11/1981 | Bouricius et al. | 364/200 |
| 4,326,098 | 4/1982 | Bouricius et al. | 380/25 |
| 4,408,203 | 10/1983 | Campbell | 178/22.08 |
| 4,433,207 | 2/1984 | Best | 178/22.09 |
| 4,439,830 | 3/1984 | Chuch | 364/200 |
| 4,446,519 | 5/1984 | Thomas | 380/25 |
| 4,465,901 | 8/1984 | Best | 178/22.08 |
| 4,471,163 | 9/1984 | Donald et al. | 380/4 |
| 4,593,353 | 6/1986 | Pickholtz | 380/25 |
| 4,652,990 | 3/1987 | Pailen et al. | 364/200 |
| 4,720,860 | 1/1988 | Weiss | 380/23 |
| 4,723,284 | 2/1988 | Munck et al. | 380/25 |
| 4,759,062 | 7/1988 | Traub et al. | 380/25 |

OTHER PUBLICATIONS

Denning, *Cryptography and Data Security*, p. 25; (Addison–Wesley, 1982).
"Cipher Systems" by Beker and Piper, p. 180, 233–235, 1982.

*Primary Examiner*—Stephen C. Buczinski
*Assistant Examiner*—Bernarr Earl Gregory
*Attorney, Agent, or Firm*—Webb, Burden, Ziesenheim & Webb

[57] ABSTRACT

Disclosed is a computer method and apparatus that permits identical copies of encrypted computer software (including a number of software elements) to be distributed to many users while retaining central control over which elements are "unlocked", that is, are authorized for use by each user.

13 Claims, 1 Drawing Sheet

MODULAR SOFTWARE SECURITY

BACKGROUND OF THE INVENTION

This application is a continuation of application 06/725,254, filed Apr. 19, 1985, now abandoned.

The present invention relates to computers and cryptosystems for use with computer software to prevent unauthorized use of the software on computers.

Frequently, a computer system is capable of receiving software which includes a number of different elements (sometimes called files, functions, modules, capabilities or options). Each element (file) may be segregated from the other elements so that the elements may be priced separately or otherwise separately controlled. The software distributor needs to deliver to each computer user those elements for which the computer user pays or is otherwise authorized. The software distributor wishes to prevent unauthorized users from having access to the elements for which the users have not paid or are otherwise unauthorized. Also, the distributor does not wish the user to be able to copy or otherwise share the software with other unauthorized users.

The ease with which computer software can be copied is both a great operational convenience and a great commercial weakness. Once a copy of software for standard computers has been delivered to a user in some form, it is usually a simple matter for the user to replicate and redistribute the software to other users whether or not the other users are authorized. Legal barriers, such as software licensing agreements and copyrights, offer some protection against unauthorized use, particularly for expensive software that has a limited number of users. Legal barriers offer less practical protection for low-priced software that runs on many machines such as personal computers.

In the environment where the software distributor also controls the design of the computer hardware on which the software will run, it is possible to erect barriers to unauthorized use by using encrypted software. For example, each computer may have an assigned identity key (typically, a unique serial number) that is accessible to the computer program and may have a built-in decryption mechanism which utilizes the identity key as a decryption key. When encrypted software is loaded into the computer, the software is automatically decrypted using the assigned computer identity key as the decryption key. In such a cryptosystem, any attempt to load encrypted software created for a different computer will fail because of the inability to decrypt the software. Key stream crypting in a cryptosystem is executed typically as follows.

Key-stream encryption uses the same process to either encrypt an unencrypted software element (file) or to decrypt an encrypted software element (file) to restore the encrypted element (file) to its original unencrypted form. The source data from the unencrypted software element (file) is treated as a data stream (that is, as a string of bits). Typically, the encryption process performs an "exclusive-or" operation between each bit of the source data stream and a corresponding bit from a key data stream. The key data stream is typically a random or pseudo-random sequence of bits. The result of this encryption operation is an encrypted data stream in which 0's and 1's occur with approximately equal probability.

Decryption of the encrypted data stream is accomplished by performing exactly the same "exclusive-or" operation on the encrypted data stream, using the same key data stream as was used during encryption. The second "exclusive-or" operation utilizing the same key data stream restores the encrypted data stream to its original unencrypted source data stream form. In other words, the "exclusive or" operation is its own inverse. In order for this key-stream cryptosystem to work, it is necessary to use identical key data streams in both the encryption and decryption processes.

By using key-stream crypting on software elements (files) stored on floppy disk or other media, the contents of those elements (files) are rendered unintelligible in the sense that a static analysis yields no information since the stored data looks like random bit patterns.

Pseudo-random number generators can be made to synthesize suitable key data streams. They have the nice property that they can generate a wide variety of such key streams under parametric control. In one system, for example, a simple additive process is used to generate the key-stream. Beginning with a "seed key" (a starting value for the "old key"), a "new key" is generated using 32-bit words by the following calculation of Eq.(1).

$$\text{"new key"} = (\text{"seed key"} + \text{"code"}) \bmod 32 \qquad \text{Eq.(1)}$$

In Eq.(1), the "code" is a constant in any given software version. By choosing different values of the "seed key" and "code" for different software versions, Eq.(1) generates a series of quite different "new keys".

Many other simple or elaborate key-stream generators are possible and have been described in well-known literature under the category "pseudo-random number generators."

While the above key-stream cryptosystem makes unauthorized use of software difficult, the cryptosystem creates a serious problem for the software distributor since the cryptosystem requires that the software be specifically encrypted for each machine on which it is to be run based on the identity key of that machine. Therefore, the software to be distributed is different for each computer so that the distributor must treat every user's computer differently and such treatment is obviously inefficient and expensive.

In view of the above limitations, there is a need for improved software cryptosystems which do not require a different encrypting of the software for each computer authorized to use the software.

SUMMARY OF THE INVENTION

The present invention is a computer method and apparatus that permits identical copies of encrypted computer software (including a number of software elements) to be distributed to many users while retaining central control over which elements are "unlocked", that is, are authorized for use by each user.

The computer software after distribution to a user is stored within the user's computer and may include both authorized and unauthorized elements. The user may "unlock" any one or more of the authorized elements by entering corresponding encrypted capability keys, usually one key for each authorized element. Each of the capability keys typically is a short string of alphanumeric characters entered through a keyboard or equivalent input device. While the capability keys may be different for each computer, the computer software including the encrypted elements are the same for all computers so that the software can be copied and disseminated by a distributor without concern about whether or not use of any particular element is authorized.

The user's computer system has interlocks that permit only those elements that have been "unlocked" by entry of a capability key to function in the computer. At the time of the initial delivery of the software, the user is given capability keys for only those elements that the user has purchased or for which the user is otherwise authorized. If the user later obtains additional capability keys corresponding to newly authorized elements, the user is then able to access the corresponding newly authorized elements. Typically, the newly authorized elements are already stored in the user's computer so that there is no need for the user to again receive the newly authorized software elements. The user need only receive the capability keys for those elements.

The computer software is typically distributed in different versions where each version has a different key-stream generator and encrypts software elements differently.

The present invention offers a substantial barrier to casual software piracy while facilitating software updates. Key-stream crypting (encryption and decryption) is used in the security system as a "first line of defense" together with capability keys which provide modular control of access to software elements.

In one embodiment, the number of uses of a software element authorized by a capability key is limited. When the limit for one capability key is reached, a user is required to enter another capability key to obtain authorization for additional uses of the same software element.

In a specific embodiment, the modular software security system permits modular control of access to software elements using specific "keys", including a "capability" key, an "identity" key, and a "stored" key.

The stored key is a key which is identical to the transformed key resulting from the transform of the capability key and the identity key. In one typical system, the stored key has two components, namely, an "authentication" key and an "access" key.

When the user is authorized to use a particular software element, as evidenced by the user having the corresponding capability key, the user enters the capability key into the user's computer system. The user's computer system transforms the capability key using the identity key to form a transformed key. The transformed key is then compared with the stored key and if a match occurs, that match indicates that access to the protected software element is authorized. Each "capability" key is provided to the user by the software distributor and controls access to a particular software element.

The "identity" key is a number for identifying a particular computer, user or other thing. When used to identify a computer, the identity key is permanently stored in the user's computer and is unique to the user's computer and therefore can function to assure that the authorized software element is authorized only for the computer having the proper identity key. The identity key transforms the capability key.

The "authentication" key is an arbitrary number that is compiled into the firmware of the computer system. The authentication key is used to check the validity of capability keys that are entered. All systems that use a given firmware version typically have the same authentication key, but the authentication key may be changed between versions.

Each software element in the system has an associated "access" key which must be matched with a portion of the transformed capability key to obtain permission to access the file. Typically, the access key is interleaved with the file data stored in the software element in a way that depends on the firmware version.

At the time of delivery of the computer system, the system has a stored key including an authentication key (software version dependent) an access key (one for each element), and a machine identity key (different for each computer). When the computer system is started, the system decrypts and downloads the computer software including certain main operating programs from the floppy disk or other program source using the same key-stream decryption process for all software. The computer software on the disk has a directory element that associates software element names with disk addresses and capability keys. Generally, there is one capability key per software element. Each software element stores an access key, generally in a number of distributed locations that are software version-dependent. Any elements with access keys of "0" are considered to be "unprotected" and no capability key is needed to access them.

In its initial configuration (before entry of any capability keys), the capability keys of all elements are set to a pre-establish value, for example, "0". No element with a capability key "0" can be accessed until a non-zero capability key has been computed and stored in the corresponding capability key field of the element directory except for unprotected elements which, as indicated by a "0" access key, require no capability key. Initially, therefore, before entry of any capability key, only the unprotected elements are accessible. Additional software elements having non-zero access keys can be "unlocked" by a capability key unlocking process.

In order to initialize the system and to unlock a protected element using the unlocking process, a capability key for the protected element is entered into the system. The entered capability key is transformed with the system identity key to form a transformed key. The transformed key is compared with the stored key. Typically, a portion of the transformed key is compared with the authentication key stored in firmware to verify the entered capability key's authenticity. If an authentication match occurs, the match resulting from entry of the correct capability key is used to "unlock" protected elements provided also that access is authorized. If an authentication key match does not occur, a special "cracker countermeasure" procedure can be performed.

If the authentication key is matched correctly, each element that has a "0" in its capability key field in the element directory is examined to determine which elements also have an access key matching another portion of the transformed capability key. Wherever an access key match is found, the capability key (not the transformed capability key) is stored into the capability key field of that element in the element directory. When the capability key is thus stored in the directory, the protected element has been unlocked and is available for use. In order to access the protected element, however, the capability key must be entered before each access.

Thereafter, whenever access to a software element is requested, the capability key stored (if any) in the element directory for that element is transformed in the same way as when the capability key was entered into the system. Portions of the transformed key derived from the stored capability key are compared with the stored authentication key and the stored access key.

If either the stored authentication key or the stored access key does not match the corresponding portion of the transformed key, the failure to match indicates that access to the element is unauthorized. Access is unauthorized, for example, if the element has been reproduced from a system with a different version of the firmware or if a floppy disk storing the element has been moved from another system to the present system. In either case, the system typically resets all capability key fields in the element directory to "0". The user must then reenter non-zero capability keys into the system in order to gain access to any protected element.

The transformation of the capability key can be done in many different ways. The important criterion is that the capability key transformation be reversible so that, given a stored key (typically including an authentication key and an access key) and a system identity key, a capability key can be computed having the property that, when transformed, it will match these keys.

Additional objects and features of the invention will appear from the following description in which the preferred embodiments of the invention have been set forth in detail in conjunction with the drawings.

DETAILED DESCRIPTION

Encrypted Capability Keys

Figure 1:
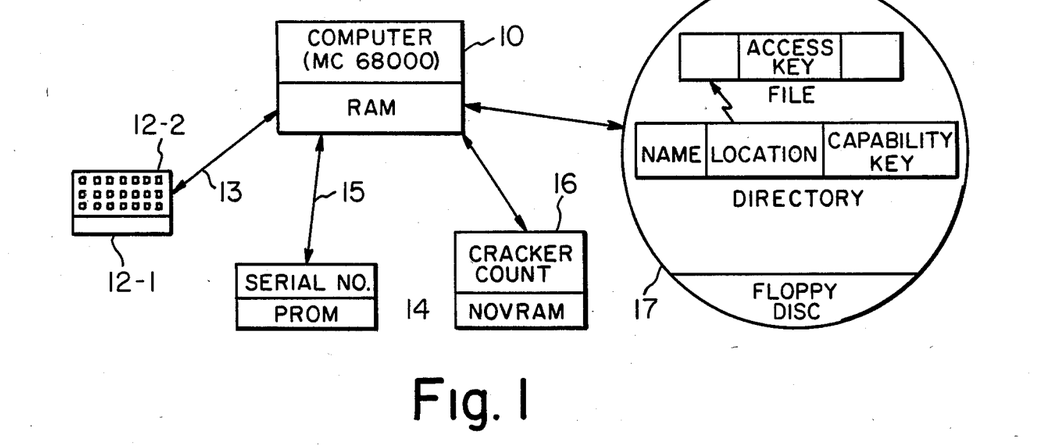
FIG. 1 depicts a cryptosystem for use in connection with or a computer.
Figure 2:
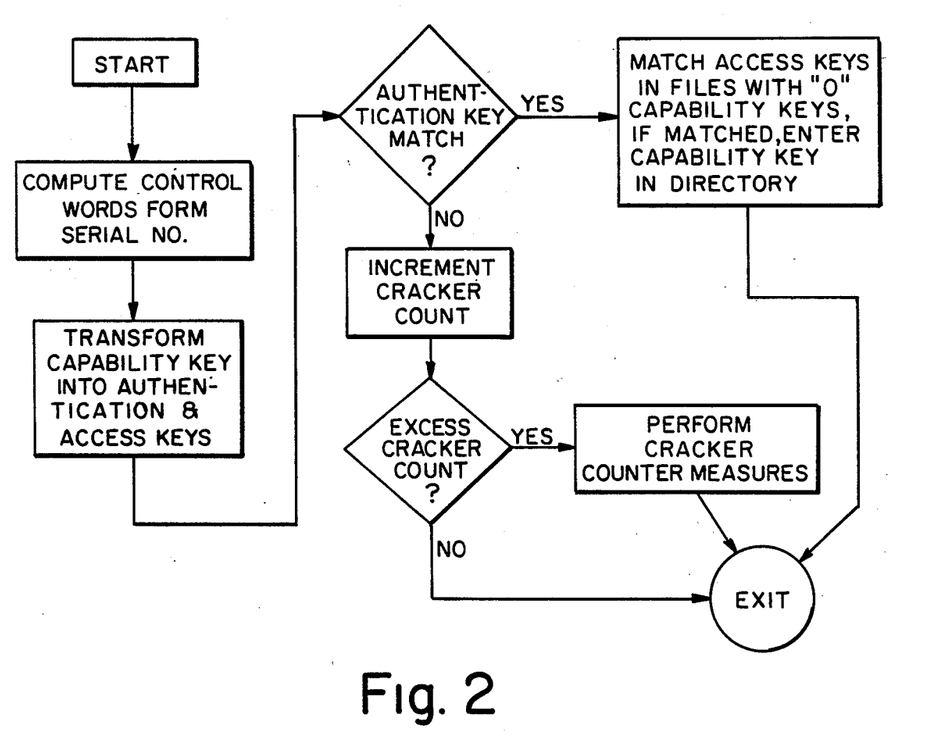
FIG. 2 depicts a flow chart which represents the operation of the FIG. 1 cryptosystem in order to enter a capability key.

A practical realization of the modular capability-key cryptosystem embodied in a printing system is shown in FIG. 1. The printing system employs a general purpose processor and a number of different computer software elements which represent different capabilities of the system. Typical hardware elements used in the printing system are as follows.

A general purpose computer 10 with integral random-access memory (RAM) 11 to store computer software (including a number of protected and/or unprotected software elements) and to store data is employed. A Motorola MC68000 microcomputer with 256k bytes of MOS RAM memory is suitable for computer 10.

An input device 12 for entering an alphanumeric string representing the capability key is employed. A display terminal 12-2 and keyboard 12-1 connected to standard RS232C port 13 of computer 10 is suitable for input device 10.

A permanent, machine-readable memory device 14 is employed to store the serial number identity key and other firmware. A PROM (programmable read-only memory) physically and electronically attached to a backplane 15 of the computer 10 is suitable for permanent memory device 14.

A small amount of permanent, alterable memory 16 is employed to keep track of the "cracker count" which is the total number of erroneous capability keys that have been entered. NOVRAM (non-volitile RAM) storage associated with the computer is suitable for memory 16.

Software file storage 17 is employed for storing software elements in encrypted form. Storage 17 typically includes a floppy disk which stores programs (including a number of protected software elements such as font files), other data, and an element directory in encrypted form.

Key-stream crypting is used to render all software elements stored in storage 17 unintelligible until key-stream decrypting is performed. The key-stream crypting is the same for all software elements of a particular version of the software and is the same for all computers (printers) of a particular release; but the crypting may be different for other versions of the software and other releases of the computer. The function of the key-stream cryptosystem is to make static analysis of software elements difficult, but such a key-stream cryptosystem is not necessary for the "unlocking" of protected software elements by use of capability keys. The unlocking of protected software elements employs capability keys and requires that the capability keys be transformed. One convenient capability-key transformation that will be used in one embodiment of the system is now described.

The computer system's identity key, $I_k$, (for example, a 32-bit serial number) is read from the system firmware stored in PROM memory 14 of FIG. 1. The identity key, $I_k$, is then transformed with the capability key, $C_k$, entered through keyboard 12 to form a transformed capability key, $T_k$, as follows:

$$I_k * C_k = T_k \qquad \text{Eq.(2)}$$

In Eq.(2), the symbol "*" designates a reversible transform which typically is performed in a number of steps. First, the serial number identity key, $I_k$, is transformed by one or more arithmetic or logical operations into two 32-bit control numbers, $B_1$ and $B_2$. Typically, these transformations of $I_k$ are version-dependent. For example, the transformations consist of multiplying $I_k$ by two different constants, $J_1$ and $J_2$ (where $J_1$ and $J_2$ may be different for different versions), as follows:

$$(I_k)(J_1) = B_1 \qquad \text{Eq.(3)}$$

$$(I_k)(J_2) = B_2 \qquad \text{Eq.(4)}$$

The transformation of the capability key, $C_k$, then further proceeds in two steps. The first control number, $B_1$, is transformed with the numeric capability key, $C_k$, to yield another 32-bit number, called the intermediate transform, $X_k$, as follows:

$$B_1 * C_k = X_k \qquad \text{Eq.(5)}$$

In Eq.(5), the transform is typically an EXCLUSIVE-OR operation as follows:

$$B_1 \oplus C_k = X_k \qquad \text{Eq.(6)}$$

The EXCLUSIVE-OR operation indicated by the symbol "$\oplus$" in Eq.(6) is bit-by-bit between each pair of correspondings bits of $B_1$ and $C_k$ and yields for corresponding bits of $X_k$ a "1" if the corresponding bits of $B_1$ and $C_k$ are different and "0" if they are the same.

The second control number, $B_2$, is used to transform the intermediate transform, $X_k$, of Eq.(6) to form the transformed capability key, $T_k$, as follows:

$$B_2 * X_k = T_k \qquad \text{Eq.(7)}$$

In Eq.(7), the transform indicated by the symbol "*" is typically a bisecting permutation indicated by the symbol $$"\begin{pmatrix} i \\ P \end{pmatrix}"$$

as follows:

$$B_2 \begin{pmatrix} i \\ P \end{pmatrix} X_k = T_k \qquad \text{Eq.(8)}$$

The bisecting permutation of Eq.(8) is performed typically in a number of steps as follows. In Eq.(8), if the high-order bit of the control number, $B_2$, is "1", swap the left and right 16-bit groups of the $X_k$ transform to form the first permuted value, $X_{k1}$. If the next bit to the right in $B_2$ is "1", swap the leftmost two 8-bit groups of $X_{k1}$ to form the left half of the next permuted value, $X_{k2}$. If the next bit to the right in $B_2$ is "1", swap the rightmost two 8-bit groups of the $X_{k1}$ value to form the right half of $X_{k2}$. Use one at a time the next four bits of $B_2$ to control swapping of the left and right halves of each of the four 8-bit groups of $X_{k2}$.

Each 8-bit group of $X_{k2}$ will swap a 4-bit left and a 4-bit right half as a function of one corresponding bit in $B_2$. When each of the four 8-bit groups of $X_{k2}$ is swapped or not as determined respectively by four bits of $B_2$, the result is the next permutted value, $X_{k3}$. The value $X_{k3}$ consists of eight 4-bit groups, each 4-bit group having 2-bit left and right halves. The next eight bits of $B_2$ control swapping of the left and right halves of the eight 4-bit groups of $X_{k3}$ and the result formed is the next permutted value $X_{k4}$. The value $X_{k4}$ consists of sixteen 2-bit groups, each group having a left bit and right bit. The next sixteen bits of $B_2$ are used to control the swapping of the left and right bits of the respective sixteen groups of $X_{k4}$ to form the next permuted value $X_{k5}$ which is the final value, $T_k$.

Note that this bisecting transform of Eq.(8) is reversible since given a desired transformed key, $T_k$, the system serial number identity key, $I_k$, and knowledge of the transform process, the process can be executed "in reverse" so as to compute a corresponding capability key, $C_k$.

After the capability key, $C_k$, has been transformed by $I_k$ to form the transformed capability key, $T_k$, the transformed capability key, $T_k$, is compared with a stored key, $S_k$. If $T_k$ matches $S_k$, then the software element associated with $S_k$ is unlocked and ready to be accessed by the system. Typically, $S_k$ is formed of two parts, namely, an authentication key, $V_k$, and an access key, $A_k$. The stored key, $S_k$, should be identical to the transformed key, $S_k$. After the capability key transformation is completed to form $T_k$, the 16-bit left half, $T_L$, of $T_k$ is compared with the authentication key, $V_k$, for this system. If $T_L$ does not match $V_k$, the failure to match indicates that use is not authorized and a special "cracker countermeasure" procedure is entered.

If the authentication code, $V_k$, matches $T_L$ correctly, each element that still has "0" in its capability key field in the element directory is examined to determine which ones have an access key, $A_k$, matching the 16-bit right half, $T_R$, of the transformed capability key, $T_k$.

Wherever a match is found between $A_k$ and $T_R$, the capability key, $C_k$, (not the transformed capability key, $T_k$) is stored in that elements capability key field of the element directory. Storing the capability key, $C_k$, into the directory constitutes entry of the capability key into the system and the "unlocking" of the corresponding protected software element.

It is important that the transformation of Eq.(2) used with the capability key effectively permutes the bits. If only key-stream encryption were used, a clever software user who had obtained authorization for several capabilities for a given computer system might compare them and deduce which elements made up the authentication key. Given that information, the security systems on all machines could be attacked without fear of countermeasures. Using a cryptosystem which permutes the bits in a system-dependent way avoids this problem.

File Access Control

Whenever file access is requested to obtain access to a protected software element, the non-zero capability key (if any) stored in the capability key field of the element directory for that software element is transformed in the same way as when the capability was initially entered into the system to unlock the protected software element. After the stored capability key, $C_k$, from the element directory is transformed to form the transformed capability key, $T_k$, the left half, $T_L$ is compared with a stored authentication key, $V_k$, and if a match results, the right half, $T_R$, is compared with a stored access key, $A_k$. If $A_k$ matches $T_R$, the protected software element is released for use by the system.

If either the authentication key, $V_k$, or the access key, $A_k$, does not match $T_L$ and $T_R$, respectively, the failure to match indicates that the corresponding protected software element has been copied from a system with a different firmware version or the floppy disk (or a copy) has been moved into the computer system from another system. In either case, the system sets all capability keys fields in the software element directory to "0". The user must then re-enter capability keys in the capability key fields of the element directory for the system in order to gain access to the various protected software elements.

The access key is stored within the data of a software element in locations which are distributed throughout the data, for example, two bytes of the access key in every 36th and 37th byte location of the data. The location of the access key within the data can change with every software version.

Using the modular security system described above, standard and identical copies of software (including many software elements whether authorized or not) can be disseminated to many different users. Authorized software elements can be unlocked at each user's computer by having the user enter a capability key for those elements for which the particular user is authorized. Although each user may have all or many software elements whether authorized for use or not, the user only obtains access to those particular elements for which the user is authorized.

Note that by storing the encrypted capability key, $C_k$, in the element directory of the system and decrypting and rechecking each capability key each time an attempt to access an element is made, the system is protected against having elements "unlocked" on one system then moved to another system. Inasmuch as the capability keys are machine-identity dependent, knowing the keys for a particular system is of no value to users of a different system. It is, of course, essential to keep the key transform confidential and to change the transform if the transform becomes known in some way.

While the protection scheme described above should adequately defend against casual software piracy, it cannot protect against certain kinds of sophisticated attack. In particular, if the attacker is given physical access to a machine together with logic analyzers and other high-speed digital recording devices, then through an extensive analysis of recordings the attacker can deduce how the decryption process is carried out and thereafter create user keys for any given capability of any machine for which the identity is known. If a successful attack of this sort is known to have occurred, a readily available defense is to change the decryption algorithm (the transform of Eq.(2)) in newer versions of the software.

EXAMPLE

A concrete example of how the encrypted capability key cryptosystem works is presented here. The stored transformed capability key, $S_k$, has two components, namely the authentication key, $V_k$ and the access key, $A_k$. Assume that the authentication key, $V_k$, for a current version of system software has been set arbitrarily to $64,345_{10}$ and that the access key, $A_k$, for a certain element having a name E (such as a printer font file) is $34,466_{10}$. The base for all numbers is indicated by a subscript. Assume a user purchases or otherwise is authorized to access the element E for a certain machine where that machine has a serial number identity key, $I_k$, $12,432_{10}$.

The particular values of the keys $V_k$, $A_k$ and $I_k$ are supplied by the software distributor, together with the constants $J_1$ and $J_2$, to the distributor's capability key generator. The generator processes the keys $V_k$, $A_k$ and $I_k$ and forms the capability key, $C_k$, which for the particular values described is $bd0fe9cf_{16}$. The capability key generator can be a special program that is kept under the software distributor's control or can be any manual or other conventional means for forming a capability key based upon the transforms employed.

In order for the capability key generator to generate the capability key, the capability key generator performs the reverse transformation of Eq.(2) as given by the following Eq.(9):

$$I_k \cdot T_k = C_k \qquad \text{Eq.(9)}$$

The transform of Eq.(9) is carried out in a number of steps analogous to the steps of Eq.(3) through (8) above. Initially, the capability key generator must have the values $B_1$ and $B_2$. In order to obtain these values, the constants $J_1$ and $J_2$ are used together with the identity key, $I_k$, repeating the multiplications of Eq.(3) and (4) to form the control numbers $B_1$ and $B_2$.

Using the control number $B_2$, the reverse transform of Eq.(7) is performed as follows:

$$B_2 \cdot T_k = X_k \qquad \text{Eq.(10)}$$

The transform of Eq. (10) is a reverse bisecting permutation transform of Eq.(8) as follows:

$$B_2 \binom{1}{p} T_k = X_k \qquad \text{Eq.(11)}$$

In Eq.(11), the value of $T_k$ equals $S_k$ which has a left half and a right half given by the authentication key, $V_k$, and the access key, $A_k$, respectively, which are inputs to the capability key generator.

Using the value of the intermediate transform, $X_k$, determined in accordance with Eq.(11) the reverse of the transform of Eq.(5) is applied to produce the capability key, $C_k$, as follows:

$$B_1 \cdot X_k = C_k \qquad \text{Eq.(12)}$$

In the particular example described, the reverse transform of Eq.(12) is performed as the reverse of the EXCLUSIVE-OR transform of Eq.(6) as follows:

$$B_1 \oplus X_k = C_k \qquad \text{Eq.(13)}$$

With the processing of Eq.(13) completed, the capability key, $C_k$, will be a 32-bit binary number, represented by the hexadecimal value $bd0fe9cf_{16}$.

This capability key, $C_k$, is conveyed to the software user to enable the user to unlock the protected software element E. When the user obtains the capability key, $C_k$, having the value $bd0fe9cf_{16}$, the user enters that value of $C_k$ into the system through the keyboard of the system.

In the example described, the capability key $C_k$, is conveyed to the software user in a keyboard symbol representation which is different from the internal representation of the capability key. The keyboard symbol representation for each of the characters in $C_k$ is arbitrary and can be with each software version. In the example described scribed, the system translates each keyboard character input for the capability key, $C_k$, into a number by letting the keyboard characters 0 through 9 stand for the numbers $0_{10}$ through $9_{10}$, letting the keyboard letters "A" through "Z" stand for the numbers $10_{10}$ through $35_{10}$, letting the keyboard letters "a" through "z" stand for the numbers $36_{10}$ through $61_{10}$, letting the keyboard symbol "/" stand for the number $62_{10}$, and letting the keyboard symbol "&" stand for the number $63_{10}$. Each of the sixty-four numbers $0_{10}$ through $63_{10}$ is defined internally in the system by a 6-bit binary number.

In accordance with the above numeric interpretation of the keyboard characters, a capability key, $C_k$, having a particular numeric value "$bd0fe9cf_{16}$" is represented by key board characters as Qz3/dF.

Each one of the six keyboard characters of $C_k$ is represented internally in the system by a 6-bit binary number. With the described representation, the six characters of $C_k$ are represented by six, 6-bit binary bits for a total of 36 binary bits. In a typical system employing only 32 bits, the program discards, from the total of 36 binary bits representing $C_k$, the four high-order binary bits. This discarding of the high-order four bits means that there are sixteen different characters defined by the lead character position of $C_k$ that will all yield the same 32-bit binary number for $C_k$. The capability key generator chooses among those sixteen at random. After translating the keyboard characters Qz3/df representing capability key, $C_k$, the computer internally has a 32-bit binary number, represented by the hexadecimal value, $bd0fe9cf_{16}$, as the internal value of the capability key, $C_k$.

Next, the computer system reads its serial number identity key ($12,432_{10}$), $I_k$, and multiplies $I_k$ (modulo 32, the word size) by two arbitrary constants, $J_1$ and $J_2$, to obtain two control numbers, respectively $B_1$, and $B_2$, in accordance with Eqs.(3) and (4). Assume the constants $J_1$ and $J_2$ are $555,555_{10}$ and $333,333_{10}$; then the resulting control numbers $B_1$ and $B_2$ will be $9bab43b0_{16}$ and $f7005bd0_{16}$, respectively.

The constant numbers $J_1$ and $J_2$ may be stored in any of several locations in the system of FIG. 1. If these values are stored in the firmware, for example in PROM 14, then the values of $J_1$ and $J_2$ remain constant for each hardware version of the computer system. Different versions of the hardware, and hence different POOM data can employ different values of $J_1$ and $J_2$. Alternatively, the constants $J_1$ and $J_2$ can be stored within the data on the floppy disk in the storage unit 17. When stored on the floppy disk of storage unit 17, the constants $J_1$ an $J_2$ may be altered for each software release so that $J_1$ and $J_2$ are independent of any particular hardware version of the computer system. As a further alternative, one of the values, for example $J_1$, may be stored in the firmware of PROM 14 and the other, $J_2$, may be stored in the software on floppy disk 17. In this way, the $J_1$ value is hardware-version dependent and the $J_2$ value can be software-release dependent.

Performing the "EXCLUSIVE-OR" operation between the first control number, $B_1$, and the numeric capability key, $C_k$, in accordance with Eq.(6) yields the value $26a4aa7f_{16}$ as the intermediate transform, $X_k$.

Next, using the second control number, $B_2$, a series of permutation operations is performed in accordance with Eq.(8) starting with $X_k$. Given that the high-order bit of the control number, $B_2$, is a "1" (because $f_{16}=1111_2$), the left and right halves (16-bit groups) are exchanged, yielding the value $aa7f26a4_{16}$ for $X_{k1}$. In similar fashion, additional permutations are performed on 8-bit, 4-bit, 2-bit, and 1-bit fields, as specified by the bits of the $B_2$ control number, yielding the following results of TABLE 1:

TABLE 1

| $k_i$ | Group Size | $X_{ki}$ | Bits of $B_2$ ($f7005bd0_{16}$) |
|---|---|---|---|
| k1 | 16-bit | $aa7f26a4_{16}$ | $1_2$ |
| k2 | 8-bit | $7faaa426_{16}$ | $11_2$ |
| k3 | 4-bit | $f7aa4a62_{16}$ | $1011_2$ |
| k4 | 2-bit | $f7aa4a62_{16}$ | $10000000_2$ |
| k5 ($T_k$) | 1-bit | $fb5986a2_{16}$ | $0010110111101000_2$ |

Taking the sixteen leftmost bits, $T_L$, of the $X_{k5}$ (equal to $T_k$) final result, yields $fb59_{16}$ which equals $64,345_{10}$ and which matches the authentication key, $V_k$, for this system so that the capability key is accepted. Finally, the sixteen rightmost bits, $T_R$, of the $X_{k5}$ (equal to $T_k$) final result yields $86a8_{16}$ which equals $34,466_{10}$ and which matches the access key, $A_k$, for a specified element. Because of the match, the numeric value of the capability key, $C_k$, is placed in the capability key field of the directory for that specified element.

Cracker Countermeasures

If the user enters a large number of capability keys (including many invalid capability keys) in an attempt to discover by trial and error valid capability keys not authorized for the user, the system keeps track of the cumulative number of invalid capability keys that have been entered (the "cracker count"). When this cracker count, $C_c$ exceeds a preset threshold, the system undertakes countermeasures.

For example, if the dissemination medium for the software is writable (for example, floppy-disk), the system may take a "self destruct" countermeasure, by clearing the disk thereby forcing the user to obtain a new copy of the computer software. A more sophisticated countermeasure has the system appear to accept the invalid capability key and then at a later time simulates a hardware or other failure with suitable error messages that are likely to induce the user to seek maintenance help, but which reveals the unauthorized attempted accesses to the maintenance person.

In order to avoid long-term accumulation of large numbers for the cracker count, which might lead to unwanted surprises to authorized but mistake-prone users, the cracker count typically is reset to 0 at some interval, for example, each time a valid new capability key is transformed and entered into the capability key field of the element directory.

For machines that are regularly maintained by an agent of the software distributor, it might suffice simply to have the diagnostic routine report the cracker count so that the maintenance staff will be alerted to suspicious activities.

Another approach to software piracy occurs when a first machine is modified to simulate the identity of a second machine where the capability keys of the second machine are known. The available countermeasures for such piracy are (1) to make it hard to change the machine identity and (2) to make it easy to examine the machine identity via program interrogation. The system described uses both approaches. The serial number system identity key is stored in an EPROM soldered into the backplane of the computer in a relatively inaccessible location. In a printing system, typically the serial number identity key is printed on all test prints. If a maintenance person or other representative of the software distributor notes a wrong identity key, then unauthorized use can be investigated.

Computer Program

A computer program summary for operating the system of FIG. 1 in accordance with the present invention is presented in the following TABLE 2.

TABLE 2

1. Read Input Type (Capability Key or Requested Element Name) and Input
   1.1 If input type is Capability Key, read input Capability Key, $C_k$
   1.2 Set NEW KEY = 1, go to 2, else
   1.3 If input type is Requested Element Name, read access key, $A_k$
   1.4 If $A_k = 0$, go to 8 else.
   1.5 Read stored capability key, $C_k$, from Element Directory
   1.6 Set NEW KEY = 0
   1.7 Set NEW KEY = 0
2. Read identity key, $I_k$
3. Transform $I_k$ and $C_k$ to form transformed key, $T_k$
   3.1 Read first constant, $J_1$
   3.2 Multiply $(I_k)(J_1)$ to form first control number, $B_1$
   3.3 Read second constant, $J_2$
   3.4 Multiply $(I_k)(J_2)$ to form second control number, $B_2$
   3.5 XOR $B_1$ and $C_k$ to form intermediate transformed key, $X_k$
   3.6 Bisecting Permute $X_k$ with $B_2$
       3.6.1 If next $B_2$ bit is "1", swap to form $X_{k1}$
       3.6.2 If next $B_2$ bit is "1", swap to form partial $X_{k2}$
           3.6.2.1 Repeat 3.6.2 to form $X_{k2}$
       3.6.3 If next $B_2$ bit is "1", swap to form partial $X_{k3}$
           3.6.3.1 Repeat 3.6.3 three times to form $X_{k3}$
       3.6.4 If next $B_2$ bit is "1", swap to form partial $X_{k4}$
           3.6.4.1 Repeat 3.6.4 seven times to form $X_{k4}$
       3.6.5 If next $B_2$ bit is "1", swap to form partial $X_{k5}$
           3.6.5.1 Repeat 3.6.5 fifteen times to form, $T_k$
4. Read Element Directory $S_k = V_k$ for adressed element
5. Compare $T_k$ ($T_L$, $T_R$) and $S_k$ ($V_k$, $A_k$)
   5.1 If $T_L \neq V_k$ go to 10, else
   5.2 If $A_k \neq T_R$ go to 10, else
   5.3 If NEW KEY = 0, go to 7, else.

TABLE 2-continued

6. Store New Capability Key,
   6.1 Store $C_k$ into Element Directory
   6.2 Write Crackercount, $C_c = 0$.
   6.3 Return to 1
7. Update use count, $U_c$
   7.1 Read use count, $U_c$ (Exxxxxxx ...)
   7.2 If E = 0, go to 10, else,
   7.3 Decrement $U_c$
   7.4 Store $U_c$
8. Enable Access to addressed software Element
9. Return to 1
10. If NEW KEY = 0 go to 12, else
11. Countermeasure
    11.1 Read $C_c$
    11.2 Increment $C_c$
    11.3 If $C_c$ less than THRESHOLD, go to 1, else
    11.4 Write "0" in all data fields
12. Write "0" in all capability key fields of element directory
13. Return to 1.

In the following TABLE 3, a portion of a typical computer program written in C language for a UNIX operating system is presented for executing the transform portions of TABLE 2. The TABLE 3 program can be compiled to run on a system of the FIG. 1 type in accordance with the principles of the present invention.

TABLE 3

```
main(argc, argv) /* strip: get gascii codes and set widths */
int argc; char *argv[ ];
{ char *cap;
unsigned capkey,perm,mask,pick;
int serial = 12432;
cap = *++argv; /* capability key */
printf("Cap. key = %s (sixbit) = ",cap);
capkey = 0;
while (*cap != /0') {
capkey = capkey*64 +
(*cap >= '0' && *cap <= '9' ? *cap - '0':
*cap >= 'A' && *cap <= 'Z' ? *cap + (10 - 'A') :
*cap >= 'a' && *cap <= 'z' ? *cap + (36 - 'a') :
*cap == '/' ? 62 :
*cap == '&' ? 63 :
0);
cap++;
};
printf("%x (hex.)  /n" ,capkey);
printf("keystream = %x  /n", serial*555555);
capkey = (serial*555555) capkey;
printf("XOR key = %x  /n" ,capkey);
perm = serial*333333;
printf("permute = %x  /n",perm);
if (perm & (1 << 31)) capkey = ((capkey & 0177777) << 16) |
(capkey >> 16);
printf("16 bit perm. = %x  /n",capkey);
if (perm & (1 << 30)) capkey = (capkey & 0177777) |
((capkey & 077600000) << 8) | ((capkey & 037700000000) >> 8);
if (perm & (1 << 29)) capkey = (capkey & 0377776000000) |
((capkey & 0177400) >> 8) | ((capkey & 0377) << 8);
printf("8 bit perm. = %x  /n",capkey);
mask = 036000000000;
for (pick = 1 << 28; pick > (1 << 24); pick = pick >> 1) }
if (perm & pick) capkey = (~(mask | (mask >> 4)) & capkey |
((capkey & mask) >> 4) | ((capkey & (mask >>4)) << 4);
mask = mask >> 8;
}
printf("4 bit perm. = %x  /n",capkey);
mask = 03000000000;
for (pick = 1 << 24; pick > (1 << 16); pick = pick >> 1) }
if (perm & pick) capkey = (~(mask | (mask >> 2))) & capkey |
((capkey & mask) >> 2) | ((capkey & (mask >> 2)) << 2);
mask = mask >> 4;
}
printf("2 bit perm. = %x  /n",capkey);
mask = 020000000000;
for (pick = 1 << 16; pick > 1 ; pick = pick >> 1) {
if (perm & pick) capkey = (~(mask | (mask >> 1))) & capkey |
((capkey & mask) >> 1) | ((capkey & (mask >> 1)) << 1);
mask = mask >> 2;
```

TABLE 3-continued

```
}
printf("1 bit perm. = %x  /n",capkey);
printf("Authentication = %x (hex.) = %d (dec.) /n" ,capkey >> 16,
capkey >> 16);
printf("Access = %x (hex.) = %d (dec.) /n" ,capkey & 01777777,
capkey & 01777777);
}
```

TABLE 4

Cap. key = Qz3/dF (sixbit) = bd0fe9cf (hex.)
keystream = 9bab43b0
XOR key = 26a4as7f
permute = f7005bd0
16 bit perm. = as7f26a4
8 bit perm. = 7faaa426
4 bit perm. = f7as4a62
2 bit perm. = f7as4a62
1 bit perm. = fb5986a2
Authentication = fb59 (hex.) = 64345 (dec.)
Access = 86a2 (hex.) = 34466 (dec.)

Other Configurations

The software security system described for a computer with keyboard input and floppy disk storage is applicable to other systems. For example, a system with hard disk or other removable medium can be used instead of a floppy disk with essentially no change in procedures. Read-only media such as ROM or optical disks can be used provided that there is enough permanent read-write storage to retain the capability keys associated with the various software elements.

If the system has a communication link to a host computer or file system, it is possible to use the same capability key scheme with files that are stored elsewhere in encrypted form and are downloaded when needed. In this case, the host stores and downloads the capability key followed by the file. The local computer transforms the capability key in the usual way, checks its authenticity, decrypts the main file, checks the access key, and if all is well, uses the file. Using the present invention, software files may be distributed without having to be concerned about unauthorized copying. Capability keys are separately distributed to users for selected systems.

The use of encrypted capability keys in accordance with the present invention inhibits the unauthorized use of software by employing a simple dissemination and updating procedure. That procedure can be augmented with additional encryption processes to further complicate the work of software pirates.

The present invention may also be employed when it is desired to control the number of authorized uses of a software element for any particular capability key $C_k$. For such an application, some location is provided, for example, in the NOVRAM memory 14, for specifying the number of authorized uses. Each time a transformed key, $T_k$, and stored key, $S_k$, match occurs, the use is recorded and compared against the number of authorized uses. When the number of authorized uses is exhausted, that capability key will no longer permit access to the software element.

In order to record the number of authorized uses, a use counter is employed. The use counter changes a use count, $U_c$, by one count each time an authorized access occurs. When the use count indicates that the authorized number of uses has been reached, an exhausted indication for the corresponding capability key is entered into the memory 14. Typically, memory 14, stores an exhausted bit, E, and a use count, $U_c$, in a use field where there is a different use field for each capability key used in the system. The E bit for each capability key is initially set to a predetermined state such as "1" and the use count is set to a value which represents the number of authorized uses. A capability key from the file directory points to the address of the corresponding use field in memory 14 each time access to the software element is to be granted. If the corresponding E bit for that capability key is still "1", the access is permitted and the use count, $U_c$, for that capability key is decremented. When $U_c$ has been decremented to zero, the E bit is set to "0" and thereafter, the capability key will no longer permit access to the software element. Typically, the E bit is the high-order bit above the count, $U_c$, and hence becomes decremented to "0" when the lower-order bits of $U_c$ are all "0" and the count is decremented by "1".

While the present invention has been described in connection with a microprocessor in a printing system, the invention can be applied in any environment where it is desirable to unlock software elements by use of capability keys. For example, where data, computer software, or other information is transmitted (over radiowaves, microwaves, data buses or otherwise) from a central source to a number of receivers, it is often desirable that particular receivers be authorized to access and use only particular elements of all of the elements of information broadcast. In such a circumstance, the broadcast information includes a number of elements, each unlockable by a capability key. The broadcast information is analogous to the information stored on the floppy disk in the printing system embodiment of the present invention. In order for a particular user or a particular receiver to use a particular element (one of the elements broadcast), the particular user enters a capability key and unlocks the corresponding element for use in the user's particular receiver system. Under this system, the capability keys are distributed separately from the broadcast information.

In another variation of the present invention in a broadcast system, the capability key need not be separately distributed. Rather, the centralized broadcasting transmitter concurrently broadcasts the user identity key for a particular receiver and the capability key associated with the element. Since only the intended receiver has possession of the identity key, only the intended receiver is able to recognize and use the corresponding capability key. In this manner, the unlocking of the particular element for a particular receiver is carried out centrally and does not require the capability key to be separately distributed to the user.

One way to prevent a previously used capability key from being used again is to store all exhausted capability keys and comparing each new capability key stored into the element directory at the time of unlocking to ensure that the key was not previously exhausted. In order to have different capability keys unlock the same software element, different access keys, $A_k$, are stored within the same data field of the software element, a different access key for each different capability key which is to unlock the file.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A protection method for restricting access by a user to authorized ones of a plurality of software elements in a computer system where the computer system permanently stores an identity key, $I_k$ distinguishing the computer system from other computer systems having the same software elements, comprising,
   inputting a capability key, $C_k$, into the computer system for unlocking a selecting one of said plurality of software elements, said capability key specifying authorization being possessed by the user with respect to said selected software element in said system,
   accessing an identity key, $I_k$, stored in the computer system for identifying the computer system,
   transforming the capability key with the identity key to form a transformed key, $T_k$, including,
      transforming the identity key, $I_k$, by at least one operation to form more than one control number, $B_i$,
      successively transforming the capability key, $C_k$, using said control numbers, $B_i$, and a set of reversible transformation functions $F_i$ to form the transformed capability key, $T_k$, as follows, $$B_i F_i X_{i-1} = X_i, i = 1, 2 \ldots N$$

wherein
      $X_0 = C_k$
      $X_N = T_k$,
   accessing a stored key $S_k$, for said selected software element, said stored key defining authorization being expected for unlocking said selected software element,
   compairing said transformed key, $T_k$, and said stored key $S_k$,
   allowing access to said selected software element if the stored key corresponding to said selected software element matches said transformed key.

2. The method of claim 1 wherein the step of transforming the identity key, $I_k$, by at least one operation consists of multiplying $I_k$ by a constant, $J_i$, as follows, $$(I_k)(J_i) = B_i, i = 1, 2 \ldots N.$$

3. The method of claim 1 wherein said set of transformation functions includes a bit-by-bit EXCLUSIVE-OR operation.

4. The method of claim 1 wherein said set of transformation functions includes a bisecting permutation indicated by the symbol $$\text{``} \begin{pmatrix} i \\ p \end{pmatrix} \text{''}$$

as follows, $$B_i \begin{pmatrix} i \\ p \end{pmatrix} X_{i-1} = X_i.$$

5. The method of claim 4 wherein $X_i$ is a 32-bit number and wherein the bisecting permutation is performed in a numbers of steps, where the control number $B_{i+1}$ is organized from a high-order bit to lower-order bits, as follows,

- if the high-order bit of the control number, $B_{i+1}$ is "1", swap the left and right 16-bit groups of $X_i$ transform to form the first permuted value, $X_{i1}$,
- if the next lower-order bit in $B_{i+1}$ is "1", swap the leftmost two 8-bit groups of $X_{i1}$ to form the left half of the next permuted value, $X_{i2}$, if the next lower-order bit in $B_{i+1}$ is "1", swap the rightmost two 8-bit groups of the $X_{i1}$ value to form the right half $X_{i2}$,
- if taken one at a time any of the next lower-order four bits of $B_{i+1}$ are a "1" swap the left and right 4-bit halves of each of the corresponding next four 8-bit groups of $X_{i2}$ to form the next permutted value, $X_{i3}$, consisting of eight 4-bit groups, each 4-bit group having 2-bit left and right halves,
- if taken one at a time any of the next eight lower-order bits of $B_{i+1}$ are "1" swap the corresponding left and right 2-bit halves of the eight 4-bit groups $X_{i3}$ to form the next permutted value $X_{i4}$ consisting of sixteen 2-bit groups, each group having a 1-bit left and 1-bit right half,
- if any one of the next sixteen lower-order bits of $B_{i+1}$ is a "1" swap of the corresponding left and right 1-bit halves of the respective sixteen groups of $X_{i4}$ to form the next permutted value, $X_{i5}$.

6. A protection apparatus for restricting access by a user to authorized ones of a plurality of software elements in a computer system where the computer system permanently stores and identity key, $I_k$ distinguishing the computer system from other computer systems having the same software elements, comprising, means for inputting a capability key, $C_k$, into the computer system for unlocking a selected one of said plurality of software elements said capability key specifying authorization being possessed by the user with respect to said selected software element in said system, means for accessing an identity key, $I_k$, stored in the computer system for identifying the computer system, means for transforming the capability key with the identity key to form a transformed key, $T_k$, including, means for transforming the identity key, $I_k$, by at least one operation to form more than one control number, $B_i$, means for successively transforming the capability key, $C_k$, using said control numbers, $B_i$, and a set of reversible transformation functions $F_i$ to form the transformed capability key, $T_k$, as follows, $$B_i F_i C_{i-1} = X_i, i = 1, 2 \ldots N$$

where
$X_o = C_k$
$X_n = T_k$.

7. The apparatus of claim 6 wherein means for transforming the identity key, $I_k$, by at least one operation includes means for multiplying $I_k$ by a constant, $J_i$, as follows, $$(I_k)(J_k) = B_i, i = 1, 2 \ldots N.$$

8. The apparatus of claim 6 wherein the first control number, $B_1$, with the capability key $C_k$, includes means for performing said set of transformation functions include a bit-by-bit EXCLUSIVE-OR operation [as follows:

$$B_1 \oplus C_k = Y_k$$

wherein the operation symbol "$\oplus$" indicates an EXCLUSIVE-OR is bit-by-bit between each pair of correspondings bits of $B_1$ and $C_k$ and yields for corresponding bits of $X_k$ a "1" if the corresponding bits of $B_1$ and $C_k$ are different and "0" if the corresponding bits of $B_1$ and $C_k$ are the same.

9. The apparatus of claim 6 wherein the means for transforming the intermediate transform, $X_k$, using the second control number, $B_2$, includes means for performing a bisecting permutation indicated by the symbol $$\binom{1}{p}$$

as follows, $$B_i \binom{1}{p} X_{i-1} = T_i.$$

10. A protection method for restricting access by a user to authorized ones of a plurality of software elements in a computer system where the computer system permanently stores an identity key, $I_k$ distinguishing the computer system from other computer system having the same software elements, comprising, inputting a capability key, $C_k$, into the computer system for unlocking a selected one of said plurality of software elements, accessing an identity key, $I_k$, stored in the computer system for identifying the computer system, transforming the capability key with the identity key to form a transformed key, $T_k$, including, transforming the identity key, $I_k$, by at least one operation to form two numbers, $B_1$ and $B_2$, wherein the step of transforming the identity key, $I_k$, by one or more operation includes multiplying $I_k$ by constants, to form $B_1$ and $B_2$ as follows:

$$(I_k)(J_1) = B_1$$

$$(I_k)(J_2) = B_2$$

transforming the first control number, $B_1$, with the capability key, $C_k$, to yield an intermediate transform, $X_k$, as follows:

$$B_1 \oplus C_k = X_k$$

transforming the intermediate transform, $X_k$, using the second control number, $B_2$, to form the transformed capability key, $T_k$, as follows:

$$B_2 \oplus X_k = T_k$$

accessing a stored key, $S_k$, for said selected software element, compairing said transformed key $T_k$ and said stored key, $S_k$, unlocking said selected software element if the transformed key corresponding to said selected software element matches said stored key.

11. A protection method for restricting access by a user to authorized ones of a plurality of software elements in a computer system where said computer system includes storage for storing said software elements and for storing an element directory, said element directory having for each software element a name field for identifying the software element, having a location field for identifying the location in storage of the software element having the corresponding name in the element directory, and having a capability key field for storing a capability key and where the computer system permanently stores an identity key, $I_k$, distinguishing the computer system from other computer systems having the same software elements, comprising, inputting a capability key, $C_k$, into the computer system for unlocking a selected software element where said selected software element is one said plurality of software elements, said capability key specifying authorization being possessed by the user with respect to said selected software element in said system, accessing the identity key, $I_k$, stored in the computer system for identifying the computer system, transforming the capability key, $C_k$, with the identity key, $I_k$, to form a transformed key, $T_k$, accessing a stored key, $S_k$, for said selected software element, said stored key defining authorization for unlocking said selected software element, compairing said transformed key, $T_k$, and said stored key, $S_k$, allowing access to said selected software element if the stored key corresponding to said selected element matches said transformed key, storing said capability key in the corresponding capability key field of the element directory if said transformed key matches said stored key corresponding to said selected one element.

12. The method of claim 11 further comprising, in response to a request by the computer system to access said selected software element, the steps of, accessing any capability key stored in the capability key field of the element directory of said selected software element, reaccessing the identity key, transforming the capability key accessed from the element directory with the identity key to reform a new transformed key, reaccessing the stored key for said selected software element, compairing said new transformed key and said stored key to determine if the transformed key and the stored key match, granting access to said selected software element if the transformed key and said stored key match.

13. The method of claim 12 further comprising the step of counting the number of unsuccessful attempts to access said selected software element, inhibiting further attempts to access said selected software element after the number of unsuccessful attempts reaches a predetermined number.

* * * * *

UNITED STATES PATENT AND TRADEMARK OFFICE
CERTIFICATE OF CORRECTION

PATENT NO. : 4,888,798  Page 1 of 5

DATED : December 19, 1989

INVENTOR(S) : Lester D. Earnest

It is certified that error appears in the above-identified patent and that said Letters Patent is hereby corrected as shown below:

On the title page item [73]:
After Assignee "OMS, Inc., Mobile, Ala." should read
--QMS, Inc., Mobile, Ala.--.

Column 5 Line 32 after "with" delete --or--.

Column 5 Line 67 "non-volitile" should read --non-volatile--.

Column 6 Line 61 "correspondings" should read --corresponding--.

Column 7 Line 33 "permutted" should read --permuted--.

Column 7 Line 38 "permutted" should read --permuted--.

Column 10 Line 3 "Vk" should read --$V_k$--.

Column 10 Line 32 after "be" insert --changed--.

Column 10 Line 33 after "described" delete --scribed--.

Column 10 Line 48 "key board" should read --keyboard--.

UNITED STATES PATENT AND TRADEMARK OFFICE
CERTIFICATE OF CORRECTION

PATENT NO. : 4,888,798                      Page 2 of 5

DATED : December 19, 1989

INVENTOR(S) : Lester D. Earnest

It is certified that error appears in the above-identified patent and that said Letters Patent is hereby corrected as shown below:

Column 11 Line 11 "POOM" should read --FROM--.

Column 11 Line 16 "an" should read --and--.

Column 11 Line 40 "12" should read --$1_2$--.

Column 11 Line 47 after "result" delete --,--.

Column 12 Line 50 after "8" insert --,--.

Column 12 Line 64 after "form" delete --,--.

Column 13 Line 30 after "12432;" insert --/* serial # */--.

Column 13 Line 33 "\0')" should read --'\0')--.

Column 13 Line 35 "'g'" should read --'9'--.

Column 13 Line 50 "0377776000000)" should read --037777600000)--.

UNITED STATES PATENT AND TRADEMARK OFFICE
CERTIFICATE OF CORRECTION

PATENT NO. : 4,888,798

DATED : December 19, 1989

INVENTOR(S) : Lester D. Earnest

It is certified that error appears in the above-identified patent and that said Letters Patent is hereby corrected as shown below:

Column 13 Line 53 "4))" should read --4)))--.

Column 13 Line 57 "%x /n"," should read --%x\n",--.

Column 13 Line 57 "03000000000" should read --030000000000--.

Column 13 Line 59 after "capkey" (second occurrence) insert --|--.

Column 13 Line 62 "%x /n"," should read --%x\n",--.

Column 14 Line 4 "%x /n"," should read --%x\n",--.

Column 14 Line 7 "01777777" should read --0177777--.

Column 14 Line 8 "01777777" should read -0177777--.

Column 14 Line 9 after "}" insert --;--.

Column 14 Line 15 "26a4as7f" should read --26a4aa7f--.

UNITED STATES PATENT AND TRADEMARK OFFICE
CERTIFICATE OF CORRECTION

PATENT NO. : 4,888,798

DATED : December 19, 1989

INVENTOR(S) : Lester D. Earnest

It is certified that error appears in the above-identified patent and that said Letters Patent is hereby corrected as shown below:

Column 14 Line 17 "as7f26a4" should read --aa7f26a4--.

Column 14 Line 19 "f7as4a62" should read --f7aa4a62--.

Column 14 Line 20 "f7as4a62" should read --f7aa4a62--.

Claim 1 Line 14 Column 16 "selecting" should read --selected--.

Claim 1 Line 33 Column 16 "wherein" should read --where--.

Claim 1 Line 40 Column 16 "compairing" should read --comparing--.

Claim 5 Line 1 Column 17 "numbers" should read --number--.

Claim 5 Line 8 Column 17 "$X_{i1}$" should read --$X_{i1}$--.

Claim 5 Line 11 Column 17 "$X_{i1}$" should read --$X_{i1}$--.

Claim 6 Line 32 Column 17 "and" should read --an--.

UNITED STATES PATENT AND TRADEMARK OFFICE
CERTIFICATE OF CORRECTION

PATENT NO. : 4,888,798

DATED : December 19, 1989

INVENTOR(S) : Lester D. Earnest

It is certified that error appears in the above-identified patent and that said Letters Patent is hereby corrected as shown below:

Claim 10 Line 65 Column 18 "compairing" should read --comparing--.

Claim 11 Line 19 Column 19 "plurability" should read --plurality--.

Claim 11 Line 30 Column 19 "compairing" should read --comparing--.

Claim 12 Line 21 Column 20 "compairing" should read --comparing--.

Signed and Sealed this

Nineteenth Day of May, 1992

Attest:

DOUGLAS B. COMER

*Attesting Officer*   *Acting Commissioner of Patents and Trademarks*